(12) United States Patent
Kimpara

(10) Patent No.: US 7,512,532 B2
(45) Date of Patent: Mar. 31, 2009

(54) TRANSLATION SERVER, TRANSLATION METHOD AND PROGRAM THEREFOR

(75) Inventor: Kyoko Kimpara, Tokyo (JP)

(73) Assignee: NEC Corporation, Tokyo (JP)

( * ) Notice: Subject to any disclaimer, the term of this patent is extended or adjusted under 35 U.S.C. 154(b) by 758 days.

(21) Appl. No.: 10/050,556

(22) Filed: Jan. 18, 2002

(65) Prior Publication Data

US 2002/0111788 A1 Aug. 15, 2002

(30) Foreign Application Priority Data

Jan. 19, 2001 (JP) .............................. 2001-011319

(51) Int. Cl.
*G06F 17/28* (2006.01)
(52) U.S. Cl. ................................ 704/3; 704/277; 704/5
(58) Field of Classification Search ............... 704/1–10, 704/277, 257
See application file for complete search history.

(56) References Cited

U.S. PATENT DOCUMENTS 5,742,505 A * 4/1998 Fushimoto et al. ............. 704/2
5,987,402 A * 11/1999 Murata et al. .................. 704/2
6,356,865 B1 * 3/2002 Franz et al. .................... 704/2

FOREIGN PATENT DOCUMENTS

JP 2000-276431 A 10/2000

OTHER PUBLICATIONS http://translation.langenberg.com/.*
Toshiki Murata et al., Machine Translation System for the Worldwide Web, Electronic Data Communications Society Technology Research Report, May 25, 1995, vol. 95, No. 77, pp. 31-36.

* cited by examiner

*Primary Examiner*—Huyen X. Vo
(74) *Attorney, Agent, or Firm*—Foley & Lardner LLP

(57) ABSTRACT

A translation server connected to a terminal via a network, comprises: an input information controller for receiving a translation instruction sent from the terminal, the translation instruction including location information representing a location of an object document to be translated, source language information representing an source language of the object document and target language information representing a translation target language of the object document, and obtaining the object document to be translated from a Web server on the basis of the location information; an information separator for separating the object document sent from the input information controller into a translation object part and a non-translation object part; a translator for translating the translation object part sent from the information separator according to the source language information and the target language information to obtain a translation result; an information converter for producing a retranslation instruction part for permitting the terminal to display a language information input column for inputting the source language information and the target language information by the user and a retranslation instruction input part and to send the translation instruction including the source language information and the target language information in the language information input column and the location information of the object document to be translated to the translation server; and an information synthesizer for synthesizing the translation result sent from the translator, the retranslation instruction part produced by the information converter and the non-translation object part sent from the information separator and sending a synthesized result to the terminal. As a result, the terminal sends a new translation instruction including the changed language information of the object document to the translation server and operability is effectively improved.

14 Claims, 13 Drawing Sheets

F I G. 4

F I G. 5
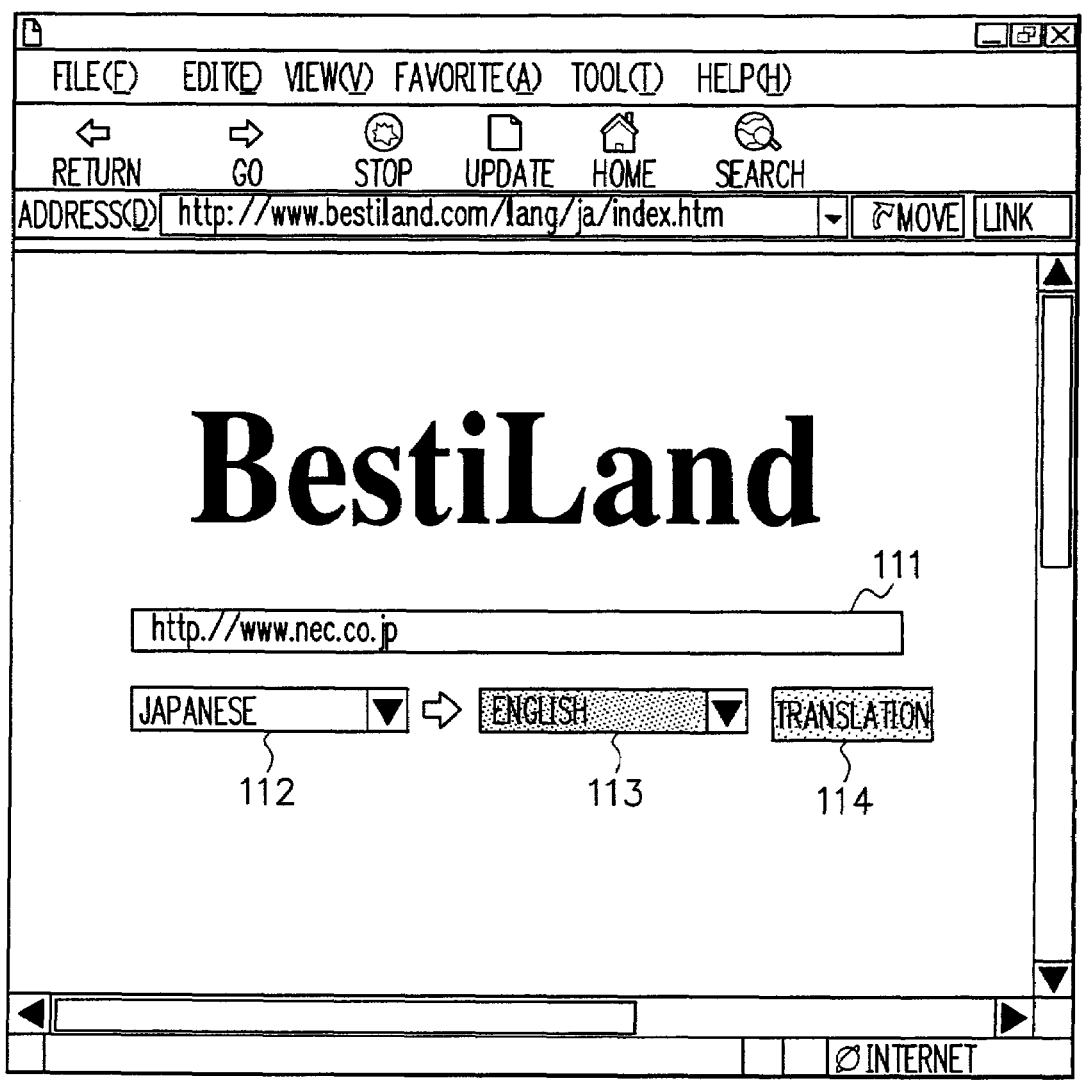

FIG. 6

```
<!DOCTYPE HTML PUBLIC"-//W3C//DTD
HTML 4.0 Transitional//EN">
<HTML><HEAD>
<META http-equiv="Content-Tyep"
content="text/html;charset=iso-2022-jp">
<LINK href="mailto;webmaster@nec.co.jp"rev=MADE">
<TITLE>NEC</TITLE>
</HEAD>
<BODY BACKGROUND="images/bg.gif"
     •
     •
     •
     •
     •
<A
href="/japanese/today/newsrel/9911/0901.html">    — R1
新ソリューション体系「iBestSolutions」を確立(11/8)</A>

<A
href="/japanese/today/newsrel/9911/0801.html">    — R2
指紋認証によるドアコントロールシステムを発売(11/8)</A>
     •
     •
     •
     •
     •
```

FIG. 8

TEXT PART T1

新ソリューション体系「iBestSolutions」を確立 (11/8).

指紋認証によるドアコントロールシステムを発売 (11/5).

USB登載 TA_Aterm (11/1)

最新プロセッサ_Express (10/26)

NON-TEXT PART T3

```
<!DOCTYPE HTML PUBLIC"-//W3C//DTD
HTML 4.0 Transitional//EN">
<HTML> <HEAD>

•
       •
       •
       •
       •

<A
href="/japanese/today/newsrel/9911/0901.html">    ⎫ R1
____</A>

<A href="/japanese/today/newsrel/9911/0801.html">  ⎫ R2
____</A>

•
       •
       •
       •
       •
```

F I G. 10

It establishes new solution system "iBestSolutions"(11/8).

It sells a door control system by the dactylogram authentication(11/5).

The USB loading TA_Aterm(11/1)

The latest processor_Express(10/26)

・・・・・

F I G. 11

```
</FORM>
<center>
<table border=0 cellspacing=1 bgcolor="#FFFFFF">
<tr>
<td bgcolor="#56cccc"> <font size=1 color=0> <small> <a herf="http://www.
bestiland.com/lang/en/index.htm"> <i> Bestiland </i> </a>
</small> </td>
<td bgcolor="#DFDFDF"> <font size=1 color=0> <small>
<a href="http://www.nec.co.jp/"> Original </a> http://www.nec.co.jp/
</small> </font> </td>
```
— A

```
<td bgcolor="DFDFDF"> <font size=1 color=0> <small>
<a href="http://www.bestiland.com/cross/hm.cgi/http%3a//www.nec.co.jp/
?SLANG=ja&TLANG=en&XTYPE=5">Update </a>
</small> </font> </td>
```
— B

```
<td bgcolor="DFDFDF"> <font size=1 color=0> <small>
<FORM action="http://www.bestiland.com/cross/hm.cgi" >
<SELECT id=select1 name=SLANG size=1>
<OPTION value=zh> Chinese
<OPTION value=de> German
<OPTION value=en> English
<OPTION value=es> Spanish
<OPTION value=fr> French
<OPTION value=it> Italian
<OPTION selected value=ja> Japanese
<OPTION value=ko> Korean
<OPTION value=pt> Portuguese
<OPTION value=ru> Russian
</SELECT>
```
— C

```
<SELECT id=select1 name=TLANG size=1 >
<OPTION value=zh> Chinese
<OPTION value=de> German
<OPTION selected value=en> English
<OPTION value=es> Spanish
<OPTION value=fr> French
<OPTION value=it> Italian
<OPTION value=ja> Japanese
<OPTION value=ko> Korean
<OPTION value=pt> Portuguese
<OPTION value=th> Thai
</SELECT>
</font>
<INPUT type=submit value="Retry"> </td>
<INPUT type=hidden name=XTYPE value=5>
<INPUT type=hidden name=SURL value="http://www.nec.co.jp/">
</Form>
</tr>
</table>
```
— D

FIG. 13

CONVERTED NON-TEXT PART T7

```
<!DOCTYPE HTML PUBLIC"-//W3C//DTD
HTML 4.0 Transitional//EN">
<HTML> <HEAD>
```

• 
• 
• 
• 
•

R11 {
```
<A                                    R1
href="/japanese/today/newsrel/9911/0901.html">
-----OBTAIN"/japanese/today/newsrel/9911/0901.html" BY
THE INPUT INFORMATION CONTROLLER AND TRANSLATE IT FROM
THE LANGUAGE OF THE FIRST SELECTION ITEM TO THE LANGUAGE
OF THE SECOND SELECTION ITEM. </A>
```

R12 {
```
                                        R2
<A href="/japanese/today/newsrel/9911/0801.html">
-----OBTAIN"/japanese/today/newsrel/9911/0801.html" BY
THE INPUT INFORMATION CONTROLLER AND TRANSLATE IT FROM
THE LANGUAGE OF THE FIRST SELECTION ITEM TO THE LANGUAGE
OF THE SECOND SELECTION ITEM. </A>
```

• 
• 
• 
•

TRANSLATION SERVER, TRANSLATION METHOD AND PROGRAM THEREFOR

BACKGROUND OF THE INVENTION

The present invention relates to an automatic translation technique and more particularly to a translation server, a translation method and a program for performing an automatic translation of documents opened on a network such as Internet or the like.

RELATED PRIOR ART

Recent years, processing capabilities of a computer such as a personal computer or a workstation have been increasingly improved and with development of a network such as Internet, various kinds of digital information is communicated by computer communications. With the improvement of the processing capabilities of the computer, an operating system (OS) having an upgraded communications environment has been proposed and a browsing program called a browser which is operated on this operating system and facilitates an access to information on the network has been offered at a low cost or no extra cost. On the Internet, for example, of the networks, a variety of information is distributed beyond national boundaries.

On the Internet, a home page of a company or a university is prepared and such a home page is made in an official language used in the country that the company or the university belongs to or in English. The browser facilitates the access to the home page. For example, when a user not using English as the native language accesses a home page prepared in English, the user cannot understand its content or it takes much time for the user to understand its meaning. When cultural exchange and economical exchange are actively performed through information communications, it is desirable to lower this language barrier as low as possible. Hence, in compliance with the request of the user of the terminal, a translation server for translating documents opened on the network and sends the translation result to the terminal is required.

FIG. 1 shows a conventional translation server system which comprises a translation server 100, a terminal 200 such as a personal computer operated by a user, and a Web server 300 for storing a plurality of documents such as hyperlink documents related with document location information, connected to one another through a network such as Internet or the like.

The translation server 100 includes a data receiver 110, an information separator 120, a translator 130 and an information synthesizer 140. The terminal 200 includes a function or device for sending a translation instruction F100 including document location information such as a uniform resource locator (URL) for representing a location of a document to be translated, source language (original language) information for representing an source language and target language (translation language) information for representing a translation target language to the translation server 100. This function is realized by a browser.

An operation of this conventional translation server system shown in FIG. 1 will be described as follows. First, user designates the URL of the translation server 100 on the browser built in the terminal 200 to access the translation server 100. Then, an input dialogue for inputting the URL of the document to be translated, the source language information and the target language information is displayed on the terminal 200. The user inputs the necessary information by using this input dialogue. The terminal 200 sends the translation instruction F100 including the URL of the object document to be translated, the source language information and the target language information to the translation server 100.

When receiving the translation instruction F100, the data receiver 110 in the translation server 100 transfers the source language information and the target language information included in the translation instruction F100 to the translator 130 and accesses the Web server 300 according to the URL included in the translation instruction F100 to receive the object document to be translated from the Web server 300.

The information separator 120 separates the object document sent from the data receiver 110 into a text part T100 and a non-text part T110 and sends the text part T100 and the non-text part T110 to the translator 130 and the information synthesizer 140, respectively.

The translator 130 translates the text part T100 in compliance with the source language information and the target language information sent from the data receiver 110 and outputs the translation result to the information synthesizer 140.

The information synthesizer 140 synthesizes the translation result sent from the translator 130 and the non-text part T110 sent from the information separator 120 and sends the synthesized result to the terminal 200 as the access source.

As a result, the terminal 200 displays the translation result of the object document to be translated on its screen.

According to above described conventional translation server system, the user inputs only the location information of the object document to be translated, the source language information and the target language information to the terminal 200 to obtain the translation result of the object document. However, in the conventional translation server system, in the case that the user made a wrong designation of the source language information and thus could not obtain a correct translation result, the operation is returned to the page for accessing the translation server and the reinput of the location information of the object document to be translated, the source language information and the target language information must be carried out. Hence, the problem of bad operability and the problem of increased communications costs arise. Further, when an object document is translated into a plurality of languages to offer the translation results to various language speakers, the operation is returned to the page for accessing the translation server and the designation of the location information of the object document to be translated, the source language information and the target language information must be conducted again. Accordingly, the same problems occur.

SUMMARY OF THE INVENTION

It is therefore an object of the present invention to provide a translation server, a translation method and a program for performing an automatic translation of documents opened on a network in view of the aforementioned problems of the prior art, which is capable of improving operability when designation of source language information and target language information is changed and an object document is retranslated and reducing communications costs.

In accordance with first aspect of the present invention, there is provided a translation server connected to a terminal via a network, comprising: an input information controller for receiving a translation instruction sent from the terminal, the translation instruction including location information representing a location of an object document to be translated, source language information representing an source language of the object document and target language information representing a translation target language of the object document, and obtaining the object document to be translated from a Web server on the basis of the location information; an information separator for separating the object document sent from the input information controller into a translation object part and a non-translation object part; a translator for translating the translation object part sent from the information separator according to the source language information and the target language information to obtain a translation result; an information converter for producing a retranslation instruction part for permitting the terminal to display a language information input column for inputting the source language information and the target language information by the user and a retranslation instruction input part and to send the translation instruction including the source language information and the target language information in the language information input column and the location information of the object document to be translated to the translation server; and an information synthesizer for synthesizing the translation result sent from the translator, the retranslation instruction part produced by the information converter and the non-translation object part sent from the information separator and sending a synthesized result to the terminal.

In a translation server of the present invention, the language information input column includes an source language information list box for selectively containing one of a plurality of source language information and a target language information list box for selectively containing one of a plurality of target language information, and the retranslation instruction part permits the terminal to set or reset at least the source language information and the target language information of the translation instruction as initial values in the source language information list box and the target language information list box, respectively.

In a translation server of the present invention, the information converter, wherein when link target document location information representing a location of a link target document included in the non-translation object part is sent from the input the information converter is sent from the input information controller and when the link target document is selected, the information converter sends translation server to the translation instruction including the source language information and the target language information in the language information input column and the link target document location information; and the information synthesizer synthesizes the translation result sent from the translator, the retranslation instruction part produced by the information converter and the converted non-translation object part after the conversion of the link target document location information into the link target document translation instruction part in the information converter and sends a synthesized result to the terminal.

In a translation server of the present invention, the object document to be translated is a hypertext markup language document. Further, the translation object part is a text part and the non-translation object part is a tag part.

In accordance with second aspect of the present invention, there is provided a translation method in a translation server connected to a terminal via a network, comprising the steps of: receiving a translation instruction sent from the terminal, the translation instruction including location information representing a location of an object document to be translated, source language information representing an source language of the object document and target language information representing a translation target language of the object document, and obtaining the object document to be translated from a Web server on the basis of the location information in an input information controller; separating the object document sent from the input information controller into a translation object part and a non-translation object part in an information separator; translating the translation object part sent from the information separator according to the source language information and the target language information to obtain a translation result in a translator; producing a retranslation instruction part for permitting the terminal to display a language information input column for inputting the source language information and the target language information by the user and a retranslation instruction input part and to send the translation instruction including the source language information and the target language information in the language information input column and the location information of the object document to be translated to the translation server in an information converter; and synthesizing the translation result sent from the translator, the retranslation instruction part produced by the information converter and the non-translation object part sent from the information separator and sending a synthesized result to the terminal in an information synthesizer.

In a translation method of the present invention, the language information input column includes an source language information list box for selectively containing one of a plurality of source language information and a target language information list box for selectively containing one of a plurality of target language information, and the retranslation instruction part permits the terminal to set the source language information and the target language information of the translation instruction as initial values in the source language information list box and the target language information list box, respectively.

In a translation method of the present invention, link target document location information representing a location of a link target document included in the non-translation object part is converted into a link target document translation instruction part for permitting the terminal to send the translation instruction including the source language information and the target language information in the language information input column and the link target document location information to the translation server when the link target document is selected, in the information converter, and the translation result sent from the translator, the retranslation instruction part produced by the information converter and the converted non-translation object part after the conversion of the link target document location information into the link target document translation instruction part in the information converter are synthesized to send a synthesized result to the terminal in the information synthesizer.

In a translation method of the present invention, the object document to be translated is a hypertext markup language document. Further, the translation object part is a text part and the non-translation object part is a tag part.

In accordance with third aspect of the present invention, there is provided a program for operating a computer as a translation server connected to a terminal via a network, comprising: an input information controller for receiving a translation instruction sent from the terminal, the translation instruction including location information representing a location of an object document to be translated, source language information representing an source language of the object document and target language information representing a translation target language of the object document, and obtaining the object document to be translated from a Web server on the basis of the location information; an information separator for separating the object document sent from the input information controller into a translation object part and a non-translation object part; a translator for translating the translation object part sent from the information separator according to the source language information and the target language information to obtain a translation result; an information converter for producing a retranslation instruction part for permitting the terminal to display a language information input column for inputting the source language information and the target language information by the user and a retranslation instruction input part and to send the translation instruction including the source language information and the target language information in the language information input column and the location information of the object document to be translated to the translation server; and an information synthesizer for synthesizing the translation result sent from the translator, the retranslation instruction part produced by the information converter and the non-translation object part sent from the information separator and sending a synthesized result to the terminal.

In a program of the present invention, the information converter converts link target document location information representing a location of a link target document included in the non-translation object part into a link target document translation instruction part for permitting the terminal to send the translation instruction including the source language information and the target language information in the language information input column and the link target document location information to the translation server when the link target document is selected, and the information synthesizer synthesizes the translation result sent from the translator, the retranslation instruction part produced by the information converter and the converted non-translation object part after the conversion of the link target document location information into the link target document translation instruction part in the information converter and sends a synthesized result to the terminal.

BRIEF DESCRIPTION OF THE DRAWINGS

The objects, features and advantages of the present invention will become more apparent from the consideration of the following detailed description, taken in conjunction with the accompanying drawings, in which:

FIG. 4 is a schematic diagram showing one embodiment of a displayed input screen of a user terminal for inputting document location information, source language information and target language information when the translation server shown in FIG. 2 is accessed;

FIG. 5 is a schematic diagram showing one embodiment of the input screen of the user terminal after required information is input;

FIG. 6 is a schematic diagram showing one embodiment of a document such as an HTML (Hypertext Markup Language) document to be translated, sent to an input information controller shown in FIG. 2;

FIG. 8 is a schematic diagram showing a text part T1 separated in an information separator shown in FIG. 2;

FIG. 9 is a schematic diagram showing a non-text part T3 separated in the information separator;

FIG. 10 is a schematic diagram showing a translated text part T2 output from a translator shown in FIG. 2;

FIG. 11 is a schematic diagram showing a retranslation instruction T6 output from an information converter shown in FIG. 2;

FIG. 13 is a schematic diagram showing a converted non-text part T7 output from the information converter.

DESCRIPTION OF THE PREFERRED EMBODIMENTS

Figure 1:
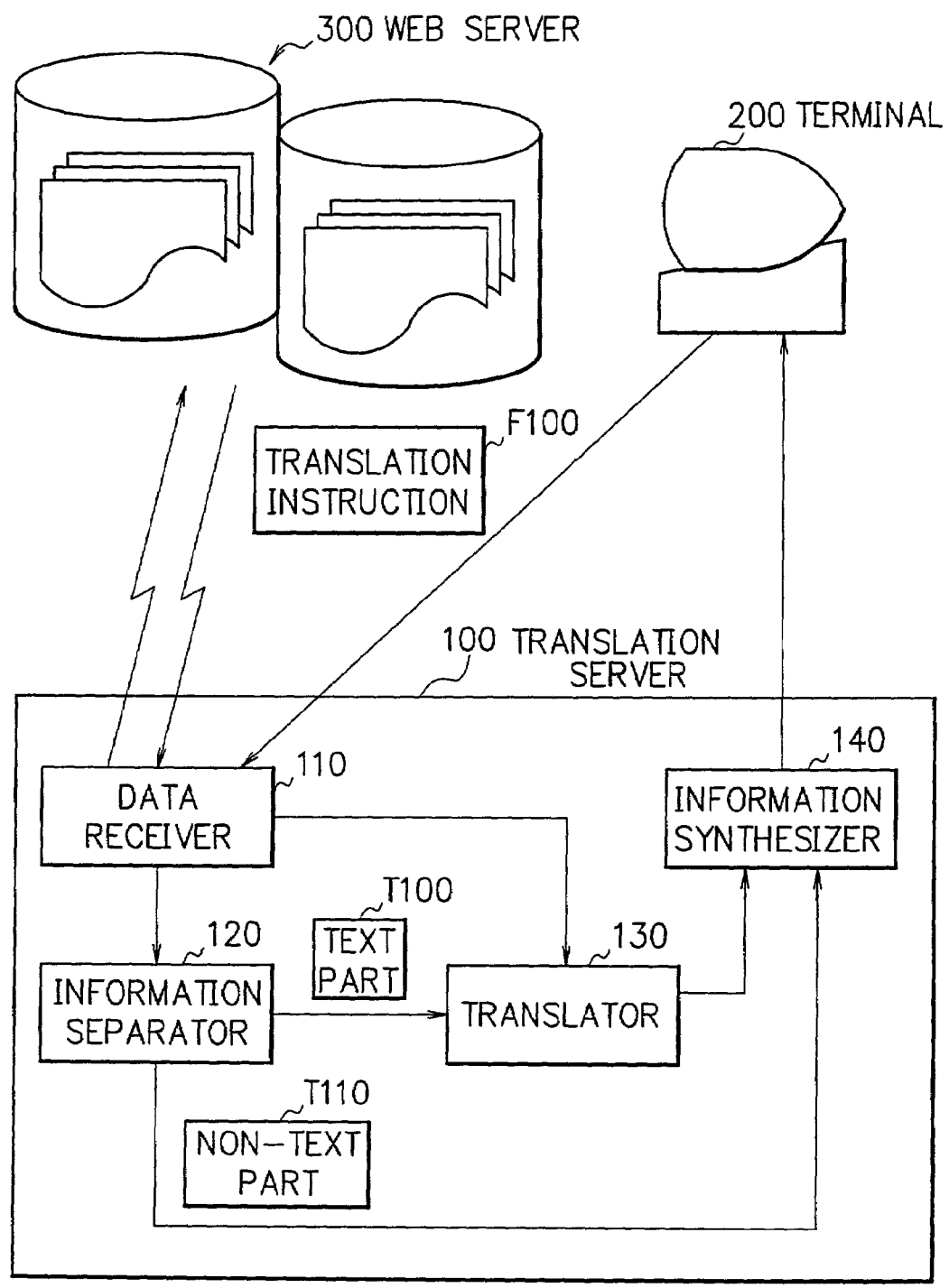
FIG. 1 is a schematic block diagram of a conventional translation server system.
Figure 2:
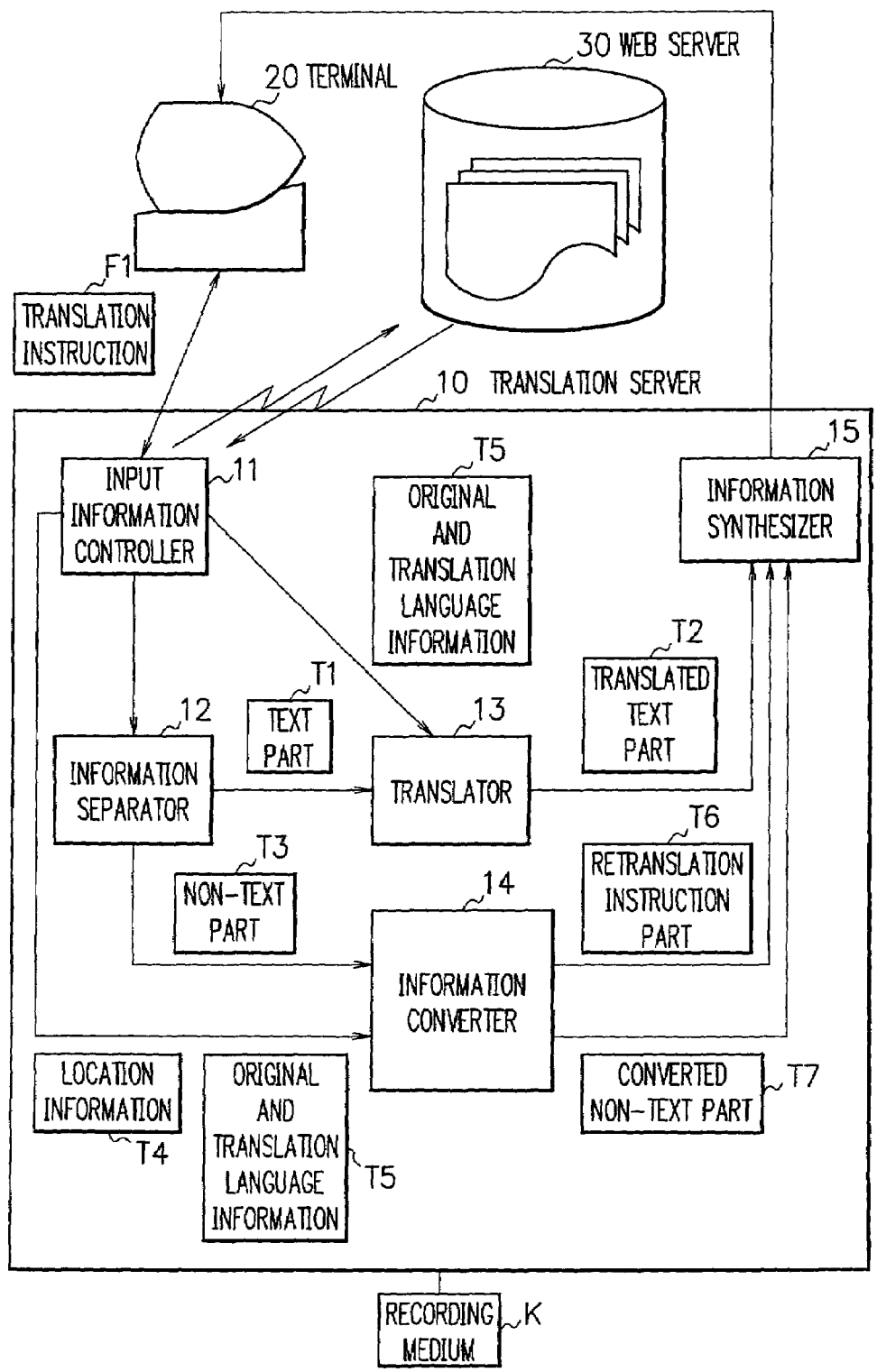
FIG. 2 is a schematic block diagram of a translation server according to a first embodiment of the present invention.

Referring now to the drawings, in FIG. 2, there is shown a translation server connected to a terminal of a user and a Web server via a network such as Internet according to a first embodiment of the present invention. In this embodiment, as shown in FIG. 2, a translation server 10 composed of a computer or the like is connected to a terminal 20 such as a personal computer or a workstation operated by a user and a Web server 30 for storing a plurality of hyperlink documents via a network such as the Internet.

The terminal 20 mounts a browsing program called a browser for facilitating an access to information on the network and includes a function or device for sending a translation instruction F1 including location information of an object document to be translated, source language information representing an source language used for the object document and target language information representing a translation target language of the translation result to the translation server 10 according to a user instruction. In this embodiment, regarding the type of the translation instruction F1, various types can be adopted. For instance, formula 1 can be used as follows.

<A href="www.nec.co.jp"

Obtain www.mec.cp.jp in an input information con-
       troller and translate a document from Japanese
       into English <A/>                      (1)

In this case, "www.nec.co.jp" is the location information of the object document to be translated, and Japanese and English are the source language information and the target language information, respectively.

The translation server 10 comprises an input information controller 11, an information separator 12, a translator 13, an information converter 14 and an information synthesizer 15. The translation server 10 further comprises a recording medium K.

The input information controller 11 receives the translation instruction F1 sent from the terminal 20, obtains the object document to be translated from the Web server 30 in compliance with the location information of the object document in the translation instruction F1 to send the obtained object document to the information separator 12, sends original and target language information T5 including the source language information and the target language information of the translation instruction F1 to the translator 13 and the information converter 14, and sends the location information T4 of the translation instruction F1 to the information converter 14.

The information separator 12 analyzes the object document to be translated, sent from the input information controller 11, separates the object document into a text part T1 and a non-text part T3, and sends the text part T1 and the non-text part T3 to the translator 13 and the information converter 14, respectively.

The translator 13 translates the text part T1 of the object document in accordance with the original and target language information T5 sent from the input information controller 11 to output a translated text part T2 to the information synthesizer 15. For instance, when the source language information and the target language information of the original and target language information T5 are English and Japanese, respectively, the text part T1 is translated from English to Japanese.

The information converter 14 carries out two jobs. First, the information converter 14 produces a retranslation instruction part T6 on the basis of the location information T4 and the original and target language information T5 to send the produced retranslation instruction part T6 to the information synthesizer 15. This retranslation instruction part T6 is used for permitting the terminal 20 to perform the followings. That is, the user operates the terminal 20 to display a language information input column for inputting the source language information and the target language information (the source language information and the target language information of the original and target language information T5 are set as the initial values) and a retranslation instruction button on the screen. When the user touches or clicks the retranslation instruction button on the screen, the terminal 20 sends the translation instruction including the source language information and the target language information in the language information input column and the location information (the location information T4) of the object document translated by the translation server 10 this time to the translation server 10.

Second, the information converter 14 converts link target document location information, included in the non-text part T3, for representing a location of a link target document into a link target document translation instruction part to produce a converted non-text part T7. The link target document translation instruction part is used for permitting the terminal to send the translation instruction including the source language information and the target language information in the language information input column and the link target document location information to the translation server 10 when the link target document is selected.

The information synthesizer 15 synthesizes the translated text part T2 sent from the translator 13, the retranslation instruction part T6 sent from the information converter 14, and the converted non-text part T7 sent from the information converter 14 and sends the synthesized result to the terminal 20 as the access source.

A disk, a semiconductor memory, or another recording means (information storing means) can be used as the recording medium K which stores a program for controlling the computer as the translation server 10. This program is read by the translation server 10 of the computer and controls the operation of the translation server 10 to realize the input information controller 11, the information separator 12, the translator 13, the information converter 14 and the information synthesizer 15 in the translation server 10.

An operation of the above-described translation server will be described in detail with reference to FIGS. 3 to 13.

Figure 3:
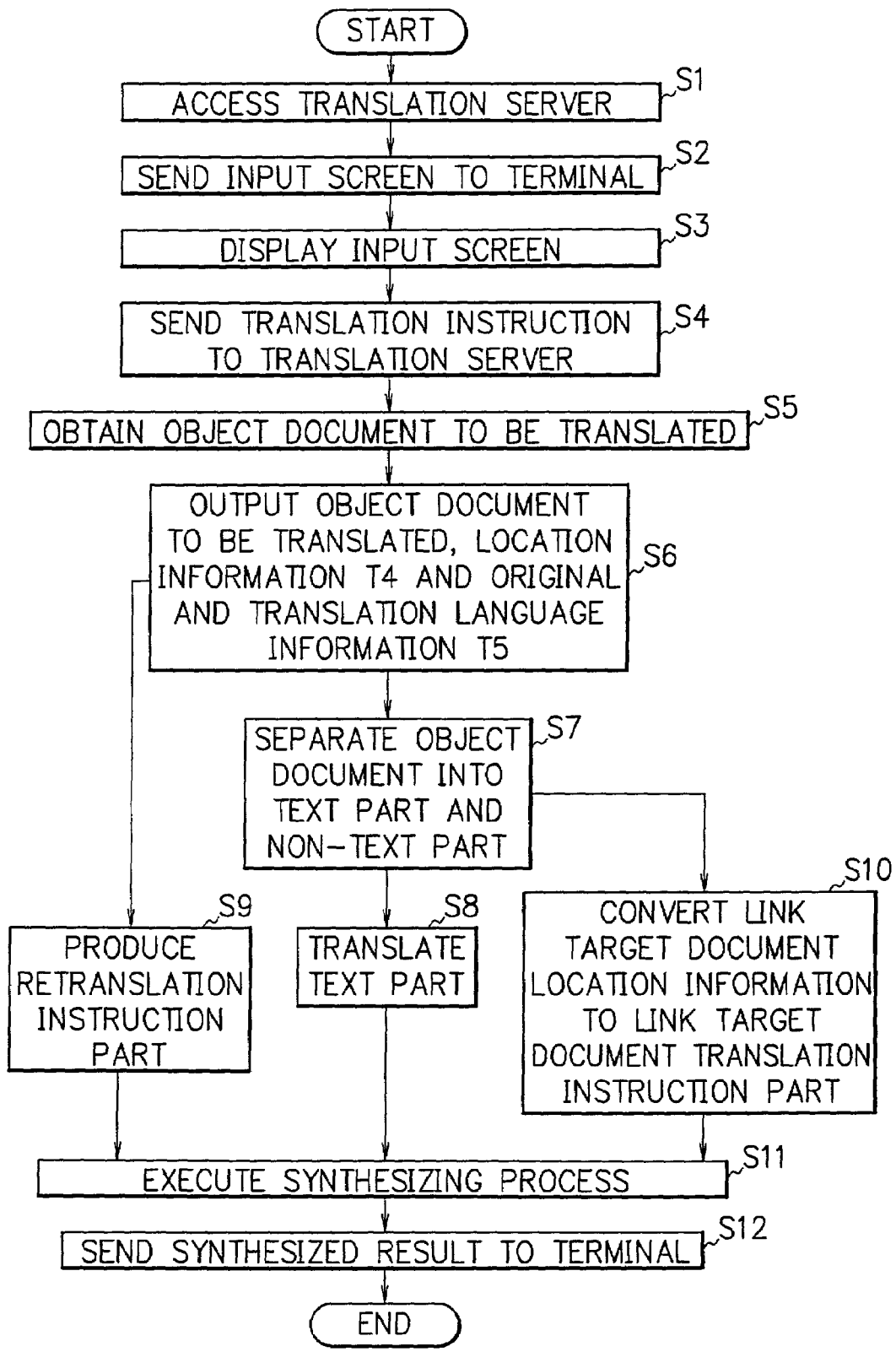
FIG. 3 is a flow chart showing an operation of the translation server shown in FIG. 2.

First, in FIG. 3, the user designates the URL (uniform resource locator) of the translation server 10 on the browser built in the terminal 20 to access the translation server 10 in step S1. Thereby, the input information controller 11 in the translation server 10 sends an input screen, as shown in FIG. 4, to the terminal 20 as the access source in step S2. The input screen, as shown in FIG. 4, includes the input columns of the location information 111 of the object document to be translated, the source language information 112 and the target language information 113, and the translation button. In the example shown in FIG. 4, English and Japanese as the initial values are set in the input columns of the source language information and the target language information, respectively.

In the terminal 20, the input screen sent from the translation server 10 is displayed and the user inputs the required information in the input columns in step S3. After inputting all the necessary information, as shown in FIG. 5, user clicks the translation button. Thus, the terminal 20 sends the translation instruction F1 including the information of the input columns to the translation server 10 in step S4. Now, for example, when the information is input in the input columns as shown in FIG. 5, the terminal 20 sends the translation instruction F1 including the location information "http://www.nec.co.jp", the source language information "Japanese" and the target language information "English" to the translation server 10.

Figure 7:
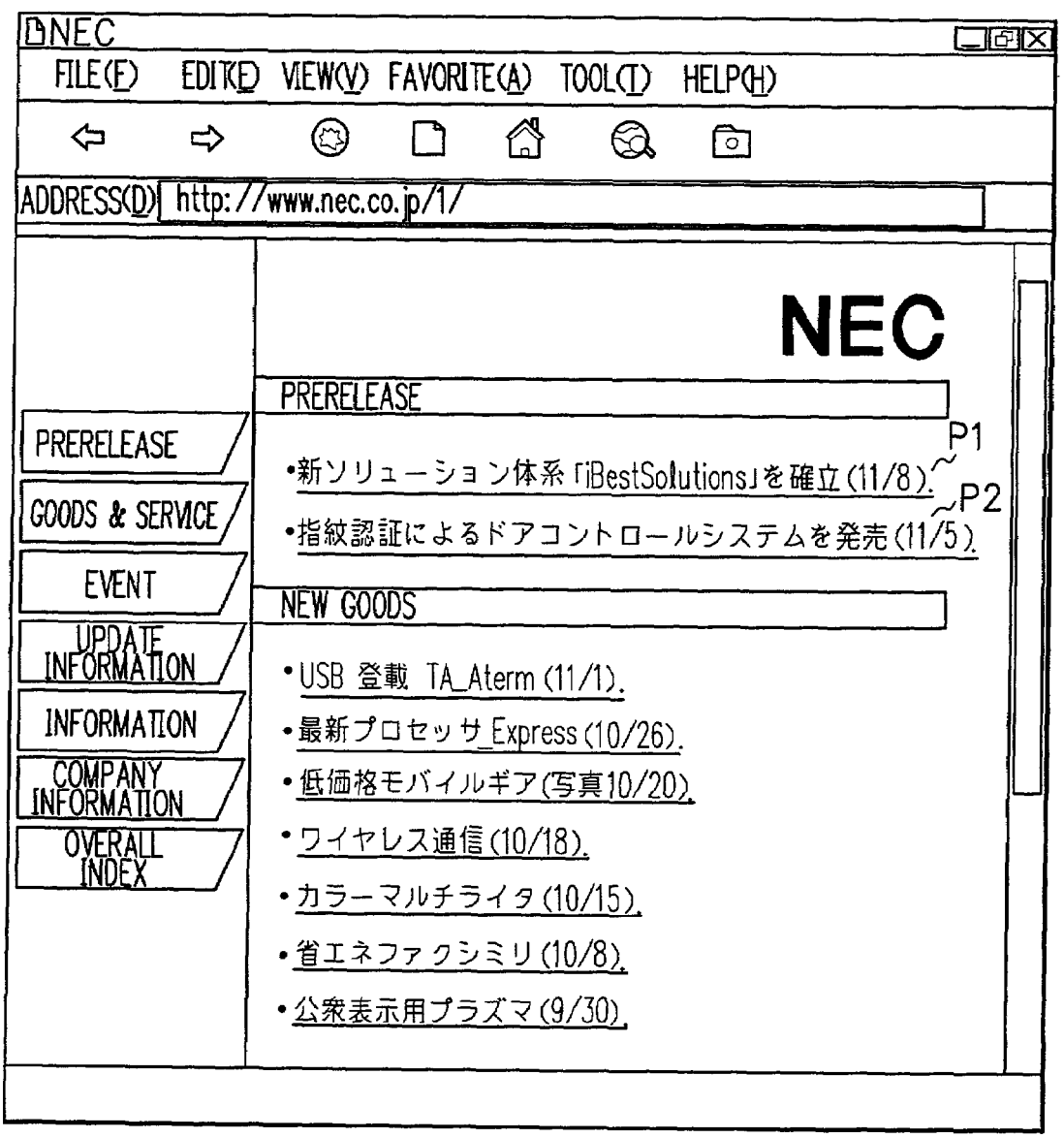
FIG. 7 is a schematic diagram showing a browser where the document shown in FIG. 6 is displayed.

In the translation server 10, when receiving the translation instruction F1 from the terminal 20, the input information controller 11 first obtains the object document to be translated from the Web server 30 on the basis of the location information "http://www.nec.co.jp" in step S5. Now, for example, when an HTML (hypertext markup language) document shown in FIG. 6 is obtained as the object document to be translated, this HTML document is displayed on the browser of the terminal 20, as shown in FIG. 7. The HTML document shown in FIG. 6 includes two pieces of link target document location information R1 and R2 representing two locations of two link target documents, and the link target documents represented by the link target document location information R1 and R2 are displayed by clicking respective parts P1 and P2 shown in FIG. 7.

Thereafter, the input information controller 11 sends the object document obtained in step S5 to the information separator 12, transfers the location information T4 "http://www.nec.co.jp" included in the translation instruction F1 to the information converter 14, and sends the original and target language information F5 "Japanese to English" indicating the source language information and the target language information in the translation instruction F1 to the translator 13 and the information converter 14 in step S6.

When receiving the object document as shown in FIG. 6 from the input information controller 11, the information separator 12 separates the object document into the text part T1 and the non-text part T3 and sends the text part T1 and the non-text part T3 to the translator 13 and the information converter 14, respectively, in step S7. In the case of the HTML object document to be translated, as shown in FIG. 6, the text part T1 and the non-text part T3 are shown in FIG. 8 and FIG. 9, respectively. That is, the tag parts constitute the non-text part T3 and the other parts become the text part T1.

After receiving the text part T1 from the information separator 12, the translator 13 translates the text part T1 from Japanese to English in accordance with the original and target language information T5 "Japanese to English" sent from the input information controller 11 to send the translated text part T2 as the translation result to the information synthesizer 15 in step S8. Now, for example, when the text part T1 shown in FIG. 8 is translated, the translation result or the translated text part T2 is shown in FIG. 10.

When receiving the location information T4 "http://www.nec.co.jp" and the original and target language information T5 "Japanese to English" from the input information controller 11, the information converter 14 produces the retranslation instruction part T6 shown in FIG. 11 to send the produced retranslation instruction part T6 to the information synthesizer 15 in step S9.

Figure 12:
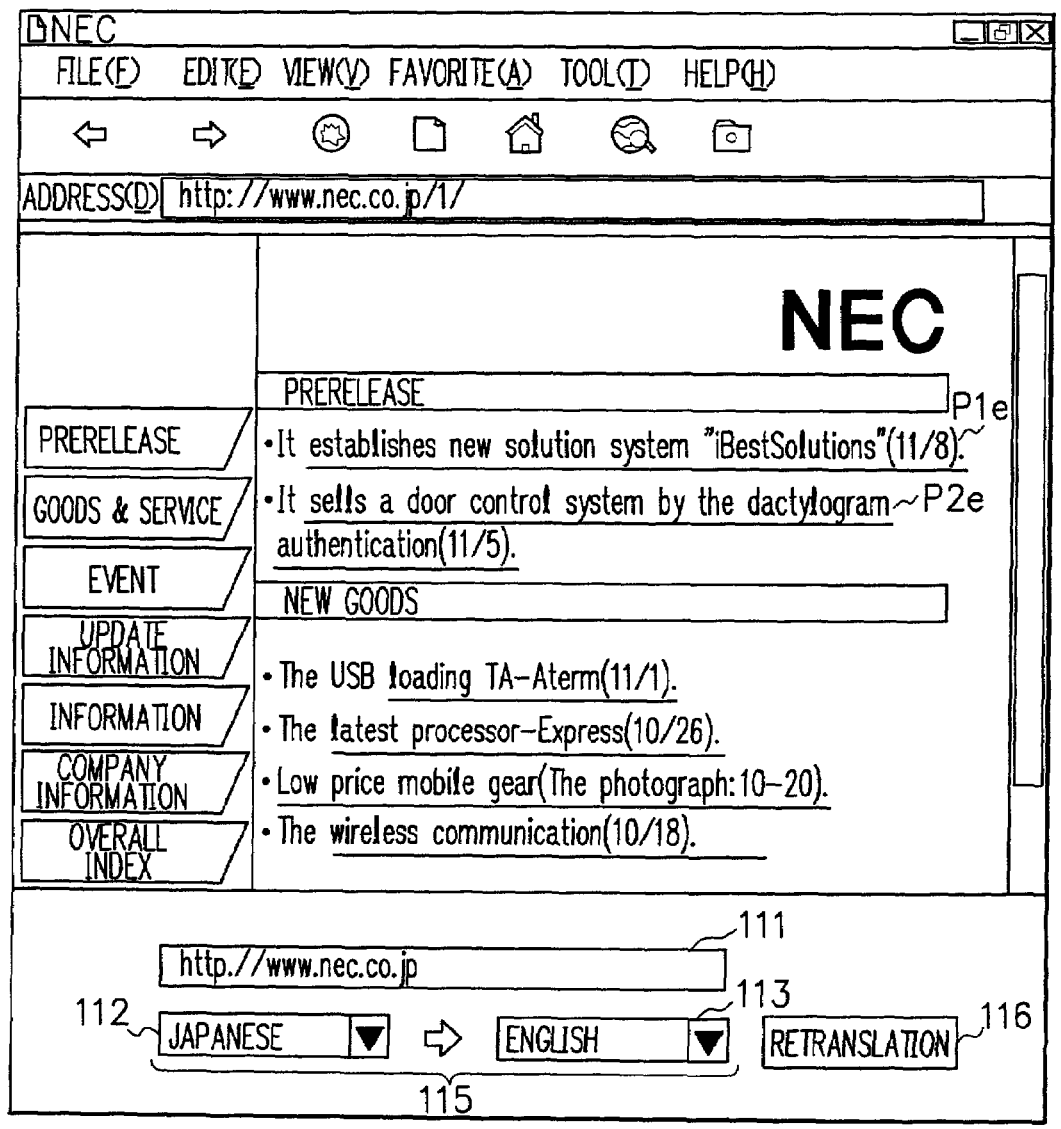
FIG. 12 is a schematic diagram showing a translation result displayed on the browser of the user terminal.

In the retranslation instruction part T6 shown in FIG. 11, a part A is used for displaying a location information input column 111 now containing the location information 4 "http://www.nec.co.jp" as the initial value on the screen of the terminal 20, as shown in FIG. 12. A part C is used for displaying an source language information list box 112 for selectively containing one of a plurality of source language information, and a part D is for displaying a target language information list box 113 for selectively containing one of a plurality of target language information. The source language information list box 112 and the target language information list box 113 constitute a language information input column 115. A part B is used for setting "Japanese" and "English" as the initial values in the source language information list box 112 and the target language information list box 113, respectively, on the basis of the original and target language information T5 "Japanese to English". The retranslation instruction part T6 further includes a part for displaying a retranslation instruction button 116, which is not shown in FIG. 11. By clicking this retranslation instruction button 116 by the user, the terminal 20 sends the translation instruction F1 including the location information in the location information input column 111, the source language information in the source language information list box 112 and the target language information in the target language information list box 113 to the translation server 10.

Furthermore, when receiving the non-text part T3 from the information separator 12, the information converter 14 converts the link target document location information included in the non-text part T3 into the link target document translation instruction part to produce the converted non-text part T7 and transfers the converted non-text part T7 to the information synthesizer 15 in step S10.

Now, for example, when receiving the non-text part T3 shown in FIG. 9, the information converter 14 converts the non-text part T3 into the converted non-text part T7 as shown in FIG. 13.

In the converted non-text part T7 shown in FIG. 13, the link target document location information R1 ""/japanese/today/newsrel/9911/0901.html"" representing the location of the link target document, as shown in FIG. 9, is converted to a link target document translation instruction part R11 which is composed of the link target document location information R1 ""/japanese/today/newsrel/9911/0901.html"" and a part for sending the translation instruction F1 representing that the link target document represented by the link target document location information R1 is translated from the source language in the source language information list box 112 to the target language in the target language information list box 113 to the translation server 10, that is, "obtain "/japanese/today/newsrel/9911/0901.html" by the input information controller and translate it from the language of the first selection item to the language of the second selection item." Further, the link target document location information R2 ""/japanese/today/newsrel/9911/0801.html"" is converted to a link target document translation instruction part R12 in the same manner as the link target document location information R1. In this embodiment, "the language of the first selection item" and "the language of the second selection item" in the link target document translation instruction parts R11 and R12 are the same as the source language in the source language information list box 112 and the target language in the target language information list box 113, respectively, and are replaced with the source language and the target language in the source language information list box 112 and the target language information list box 113, respectively, when they are sent as the translation instruction F1 to the translation server 10.

The information synthesizer 15 synthesizes the translated text part T2 sent from the translator 13 and the retranslation instruction part T6 and the converted non-text part T7 sent from the information converter 14 in step S11 and sends the synthesized result to the terminal 20 in step S12.

In the terminal 20, as shown in FIG. 12, the browser displays the translated document (English), the location information input column 111, the source language information list box 112, the target language information list box 113 and the retranslation instruction button 116 on the basis of the synthesized result sent from the information synthesizer 15. In the location information input column 111, the source language information list box 112 and the target language information list box 113, the location information (the location information of the original document of the translated document now being displayed), the source language information and the target language information as the initial values in the updated translation instruction F1 sent from the terminal 20 to the translation server 10 are set.

When the correct translated document is not displayed on the browser, the user of the terminal 20 judges that there was an error in the source language information in the updated translation instruction F1 sent to the translation server 10 and thus designates again the source language information in the source language information list box 112. The user then clicks the retranslation instruction button 116. Hence, the terminal 20 sends the translation instruction F1 including the location information in the location information input column 111, the source language information in the source language information list box 112 and the target language information in the target language information list box 113 displayed on the browser to the translation server 10. When receiving the translation instruction F1, the translation server 10 the same processing as described above in steps S5 to S12, as shown in FIG. 3.

Furthermore, when the user of the terminal 20 wants to obtain another translated document in another language, the user designates again another target language information in the target language information list box 113 and thereafter clicks the retranslation instruction button 116. The terminal 20 thus sends the translation instruction F1 including the information in the input column and boxes 111 to 113 to the translation server 10.

As described above, in this embodiment, the terminal 20 can display the source language information list box 112, the target language information list box 113 and the retranslation instruction button 116 besides the translated document on the same page of the browser and send the translation instruction F1 including the changed source language information and the changed target language information input in the source language information list box 112 and the target language information list box 113 to the translation server 10. As a result, in the present invention, operability can be effectively improved and communications costs can be reduced as compared with the conventional system in which the operation must be returned to the page to access the translation server.

In addition, in FIG. 12, parts P1e and P2e for displaying link target documents by clicking correspond to the link target document translation instruction parts R11 and R12, respectively, as shown in FIG. 13. Hence, when the part P1e is clicked, the browser of the terminal 20 produces the translation instruction F1 in accordance with the content of the link target document translation instruction part R11, the content of the source language information list box 112 and the content of the target language information list box 113 and sends the produced translation instruction F1 to the translation server 10. The translation server 10 then carries out the processing of the link target document indicated by the location information in the translation instruction F1 as the object document to be translated in the same manner as described above in steps S5 to S12, as shown in FIG. 3.

As described above, in the present invention, when the translation result is sent from the translation server to the terminal of the user, the retranslation instruction part for displaying the language information input column and the retranslation instruction input part is synthesized with the translation result and the synthesized result is sent to the terminal. Hence, in the terminal, the language information input column for inputting the source language information and the target language information and the retranslation instruction input part are displayed besides the translation result on the same page. When the source language information of the target language information is changed and the object document is retranslated, all the user must do is to input the source language information and the target language information in the language information input column and to click the retranslation instruction input part, which are displayed in addition to the translation result on the same page. Hence, the operability can be effectively improved and the communications costs can be reduced as compared with the conventional system in which the operation must be returned to the page to access the translation server.

In the present invention, the source language information and the target language information of the updated translation instruction already sent to the translation server as the initial values are displayed in the source language information list box and the target language information list box of the language information input column on the browser. Hence, when only the source language information is changed, it is sufficient to input the new source language information in the source language information list box, or when only the target language information is changed, it is sufficient to input the new target language information in the target language information list box, and as a result, the operability can be further improved.

Further, in the present invention, when the translation result is sent from the translation server to the terminal, the translation server synthesizes the converted non-translation part obtained after the conversion of the link target document location information into the link target document translation instruction part with the translation result and sends the synthesized result to the terminal. Hence, only by a simple operation such as clicking the part indicating the link target document of the translation result, the user of the terminal can instruct the translation server to translate the link target document.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A translation server connected to a user terminal via a network, comprising:
   an input information controller for receiving a translation instruction sent from the terminal, the first translation instruction including location information representing a location of an object document to be translated, source language information representing a source language of the object document and target language information representing a translation target language of the object document, and obtaining the object document to be translated from a Web server on the basis of the location information;
   an information separator for separating the object document sent from the input information controller into a translation object part and a non-translation object part;
   a translator for translating the translation object part sent from the information separator according to the source language information and the target language information to obtain a translation result;
   an information converter for producing a retranslation instruction part, the retranslation instruction part causing the terminal to display
   (1) at least one language information input column configured to receive source language information and/or target language information input by the user for retranslation,
   (2) the location information, previously inputted by a user of the terminal, representing the location of the object document to be translated, and
   (3) a retranslation instruction input part,
   and, upon operation of the retranslation instruction input part by the user of the terminal, the retranslation instruction part causing the terminal to send to the translation server a second translation instruction including source language information and target language information from the language information input column and the location information of the object document to be translated, said location information being previously inputted by said user of the terminal in the first translation instruction; and
   an information synthesizer for assembling the translation result sent from the translator, the retranslation instruction part produced by the information converter and the non-translation object part sent from the information separator and sending a synthesized result to the terminal.

2. The translation server claimed in claim 1, wherein the at least one language information input column includes a source language information list box for selecting one of a plurality of source language information and a separate target language information list box for selecting one of a plurality of target language information, and
   the information converter sets or resets both of the source language information and the target language information of the translation instruction to initial values as specified in said first translation instruction for the source language information list box and the target language information list box, respectively.

3. The translation server claimed in claim 2, wherein the object document to be translated is a hypertext markup language document, wherein the translation object part is a text part, wherein the non-translation object part is a tag part.

4. The translation server claimed in claim 1, wherein the information converter converts from link target document location information representing a location of a link target document included in the non-translation object part to a link target document translation instruction part for permitting the terminal to send the translation instruction including the source language information and the target language information in the language information input column and the link target document location information to the translation server when the link target document is selected,
   the information synthesizer assembles the translation result sent from the translator, the retranslation instruction part produced by the information converter and the converted non-translation object part after the conversion of the link target document location information into the link target document translation instruction part in the information converter and sends a assembled result to the terminal.

5. The translation server claimed in claim 4, wherein the object document to be translated is a hypertext markup language document, wherein the translation object part is a text part, wherein the non-translation object part is a tag part.

6. The translation server claimed in claim 1, wherein the object document to be translated is a hypertext markup language document, wherein the translation object part is a text part, wherein the non-translation object part is a tag part.

7. A translation method in a translation server connected to a terminal via a network, comprising the steps of:

receiving a first translation instruction sent from the terminal, the first translation instruction including location information representing a location of an object document to be translated, source language information representing a source language of the object document and target language information representing a translation target language of the object document, and obtaining the object document to be translated from a Web server on the basis of the location information in an input information controller;

separating the object document sent from the input information controller into a translation object part and a non-translation object part in an information separator;

translating the translation object part sent from the information separator according to the source language information and the target language information to obtain a translation result in a translator;

producing a retranslation instruction part, the retranslation instruction part causing the terminal to display (1) at least one language information input column configured to receive source language information and/or target language information input by the user for retranslation, (2) the location information, previously inputted by a user of the terminal, representing the location of the object document to be translated, and (3) a retranslation instruction input part, and, upon operation of the retranslation instruction input part by the user of the terminal, the retranslation instruction part causing the terminal to send to the translation server a second translation instruction including source language information and target language information from the language information input column and the location information of the object document to be translated, said location information being previously inputted by said user of the terminal in the first translation instruction; and assembling the translation result sent from the translator, the retranslation instruction part produced by the information converter and the non-translation object part sent from the information separator and sending an assembled result to the terminal.

8. The translation method claimed in claim 7, wherein the at least one language information input column includes a source language information list box for selectively containing one of a plurality of source language information and a separate target language information list box for selectively containing one of a plurality of target language information, wherein the retranslation instruction part permits the terminal to set the source language information and the target language information of the translation instruction as initial values as specified by said first translation instruction in the source language information list box and the target language information list box, respectively.

9. The translation method claimed in claim 8, wherein the object document to be translated is a hypertext markup language document, wherein the translation object part is a text part, wherein the non-translation object part is a tag part.

10. The translation method claimed in claim 7, wherein link target document location information representing a location of a link target document included in the non-translation object part is converted into a link target document translation instruction part for permitting the terminal to send the translation instruction including the source language information and the target language information in the language information input column and the link target document location information to the translation server when the link target document is selected, in the information converter, wherein the translation result sent from the translator, the retranslation instruction part produced by the information converter and the converted non-translation object part after the conversion of the link target document location information into the link target document translation instruction part in the information converter are synthesized to send a synthesized result to the terminal in the information synthesizer.

11. The translation method claimed in claim 10, wherein the object document to be translated is a hypertext markup language document, wherein the translation object part is a text part, wherein the non-translation object part is a tag part.

12. The translation method claimed in claim 7, wherein the object document to be translated is a hypertext markup language document, wherein the translation object part is a text part, wherein the non-translation object part is a tag part.

13. A recording medium for storing a computer program which, when executed by a computer, causes said computer to operate as a translation server connected to a terminal via a network, said translation server performing the steps of:

receiving a first translation instruction sent from the terminal, the first translation instruction including location information representing a location of an object document to be translated, source language information representing a source language of the object document and target language information representing a translation target language of the object document, and obtaining the object document to be translated from a Web server on the basis of the location information;

separating the object document sent from the input information controller module into a translation object part and a non-translation object part;

translating the translation object part sent from the information separator module according to the source language information and the target language information to obtain a translation result;

producing a retranslation instruction part, the retranslation instruction part causing the terminal to display (1) at least one language information input column configured to receive source language information and/ or target language information input by the user for retranslation, (2) the location information, previously inputted by a user of the terminal, representing the location of the object document to be translated, and (3) a retranslation instruction input part, and, upon operation of the retranslation instruction input part by the user of the terminal, the retranslation instruction part causing the terminal to send to the translation server a second translation instruction including source language information and target language information from the language information input column and the location information of the object document to be translated, said location information being previously inputted by said user of the terminal in the first translation instruction; and assembling the translation result, the retranslation instruction part and the non-translation object part and sending a synthesized result to the terminal.

14. The recording medium as recited in claim 13, which, when executed by said computer, causes said computer to further performs the steps of:

converting link target document location information representing a location of a link target document included in the non-translation object part into a link target document translation instruction part for permitting the terminal to send the translation instruction including the source language information and the target language information in the language information input column and the link target document location information to a translation server system when the link target document is selected, and synthesizes the translation result sent from the translation server system, the retranslation instruction part and the converted non-translation object part after the conversion of the link target document location information into the link target document translation instruction part and sending a synthesized result to the terminal.

* * * * *